(12) United States Patent
Hara

(10) Patent No.: US 7,456,844 B2
(45) Date of Patent: Nov. 25, 2008

(54) IMAGE TRANSMISSION METHOD, COMPUTER-READABLE IMAGE TRANSMISSION PROGRAM, RECORDING MEDIUM, AND IMAGE TRANSMISSION APPARATUS

(75) Inventor: Junichi Hara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 413 days.

(21) Appl. No.: 11/398,677

(22) Filed: Apr. 6, 2006

(65) Prior Publication Data
US 2006/0228033 A1 Oct. 12, 2006

(30) Foreign Application Priority Data
Apr. 7, 2005 (JP) .............................. 2005-111037

(51) Int. Cl.
G06K 9/46 (2006.01)
G09G 5/00 (2006.01)
G09G 5/02 (2006.01)

(52) U.S. Cl. ................. 345/589; 345/606; 345/660; 345/555; 348/210.99; 348/560; 348/568; 382/232; 382/166; 382/260; 382/235; 358/505; 358/525; 358/539; 715/815; 715/800

(58) Field of Classification Search ................. 345/589, 345/600, 606, 618, 619, 643, 660, 670, 552, 345/555, 549; 382/162–167, 173, 300, 260–265, 382/232–235, 282; 358/518, 505, 524–525, 358/538–539; 348/210, 211.1, 395.1, 560, 348/568, 440.1
See application file for complete search history.

(56) References Cited

U.S. PATENT DOCUMENTS

| | | | |
|---|---|---|---|
| 6,173,086 B1* | 1/2001 | Hara ........................... | 382/276 |
| 6,674,436 B1* | 1/2004 | Dresevic et al. ............. | 345/472 |
| 2001/0033370 A1* | 10/2001 | Enomoto et al. .............. | 355/77 |

FOREIGN PATENT DOCUMENTS

| | | |
|---|---|---|
| EP | 1 496 703 A1 | 1/2005 |
| JP | 2004-40674 | 2/2004 |
| JP | 2004-208266 | 7/2004 |
| JP | 2004-228717 | 8/2004 |
| JP | 2004-274758 | 9/2004 |
| JP | 2004-349939 | 12/2004 |

OTHER PUBLICATIONS

Gene K. Wu, et al., "New Compression Paradigms in JPEG2000", Proceedings of SPIE, vol. 4115, XP008013391, Jul. 2000, pp. 418-429.
Jin Li, et al., "On Interactive Browsing of Large Images", IEEE Transactions on Multimedia, vol. 5, No. 4, XP-002314804, Dec. 2003.
Junichi Hara, "An Implementation of JPEG 2000 Interactive Image Communication System", Circuits and Systems, IEEE International Symposium on Kobe, XP010816883, May 2005, pp. 5922-5925.
Michael Gormish, et al., "Tile-Based Transport of JPEG 2000 Images", Lecture Notes in Computer Science, vol. 2849, XP-002392500, pp. 217-224.
Michael J. Owen, et al., "The design and Implementation of a Progressive On-demand image Dissemination System for Very Large Images", Computer Science Conference, IEEE COMPUT. SOC US, XP010534703, pp. 148-155.
Michael W. Marcellin, et al., "An Overview of JPEG-2000", Data Compression Conference, IEEE COMPUT. SOC US, XP010377392, Mar. 2000, pp. 523-541.

\* cited by examiner

*Primary Examiner*—Wesner Sajous
(74) *Attorney, Agent, or Firm*—Oblon, Spivak, McClelland, Maier & Neustadt, P.C.

(57) ABSTRACT

An image transmission method comprises the steps of: receiving a request including request information having size information concerning an image and/or area information concerning the image; reconstructing small image areas by taking out code words constituting the small image areas based on the request information, the code words being independent of one another; and transmitting a response including the small image area to a requester in each small image area reconstructed in the step of reconstructing small image areas.

25 Claims, 16 Drawing Sheets

FIG.13

FIG.14
(A) 
(B) 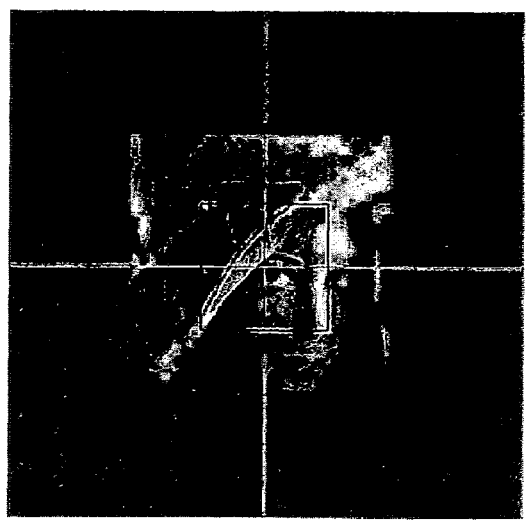

FIG.15

| AREA OF REQUESTED VIEW WINDOW | TRANSMITTED BYTES | | SUPERIORITY OF JPT-STREAM METHOD ACCORDING TO PRESENT INVENSION |
|---|---|---|---|
| | JPT-STREAM METHOD ACCORDING TO PRESENT INVENTION | JPP-STREAM METHOD | |
| R1:(192,192)–(320,320) | 14,206 | 13,275 | -931 |
| R2:(152,152)–(280,280) | 19,623 | 18,892 | -731 |
| R3:(0,0)–(256,256) | 42,696 | 44,211 | 1,515 |
| R4:(0,0)–(128,128) | 10,394 | 10,481 | 87 |
| R5:(0,0)–(30,30) | 1,851 | 1,513 | -338 |

(A) FIRST RESOLUTION
(B) SECOND RESOLUTION
(C) THIRD RESOLUTION

FIG.17

| SIZE OF REQUESTED FRAME | TRANSMITTED BYTES | | SUPERIORITY OF JPT-STREAM METHOD ACCORDING TO PRESENT INVENSION |
|---|---|---|---|
| | JPT-STREAM METHOD ACCORDING TO PRESENT INVENTION | JPP-STREAM METHOD | |
| 16 × 16 | 1,049 | 994 | −55 |
| 32 × 32 | 1,778 | 1,750 | −28 |
| 64 × 64 | 4,390 | 4,424 | 34 |
| 128 × 128 | 13,629 | 13,974 | 345 |
| 256 × 256 | 47,187 | 48,741 | 1,554 |
| 512 × 512 | 168,626 | 174,794 | 6,168 |

IMAGE TRANSMISSION METHOD, COMPUTER-READABLE IMAGE TRANSMISSION PROGRAM, RECORDING MEDIUM, AND IMAGE TRANSMISSION APPARATUS

BACKGROUND OF THE INVENTION

1. Field of the Invention

The present invention relates to an image transmission method, a computer-readable image transmission program, a recording medium, and an image transmission apparatus.

2. Description of the Related Art

In recent years, in the fields of ubiquitous computing, home computer networking, and the like, it is important to transmit information other than sound such as video and still images. In many systems for transmitting video and still images, encoding techniques such as JPEG (Joint Photographic Experts Group), MPEG (Moving Picture Experts Group), and the like are used for efficient encoding.

Transmission methods using encoding such as JPEG, MPEG, and the like are efficient in transmission in a predetermined format but are problematic in that they are not suitable (namely, not efficient) for interactive transmission. In view of this, JPEG 2000 was standardized as a novel image encoding method in the end of 2000 (refer to Non-patent Documents 1 to 5, for example).

Due to the image encoding method of JPEG 2000, it is possible to efficiently encode video and still images in interactive transmission and to process in accordance with an object without decoding code streams after the encoding.

JPEG 2000 Part 9 referred to as JPIP is an international standard for transmitting video and still images encoded using JPEG 2000. JPIP includes a transmission method with a tile unit (JPT-stream method) and a transmission method with a precinct unit which is an area unit smaller than a tile (JPP-stream method) (refer to Patent Documents 1 to 5, for example).

The following describes an example of a configuration of a server/client system according to JPIP (hereafter simply referred to as a JPIP system) with reference to FIG. 1. FIG. 1 is a configuration diagram of a JPIP system. As shown in FIG. 1, The JPIP system includes a JPIP server and a JPIP client. The JPIP server returns an image area (or code words corresponding to the image area) to the JPIP client in response to a request from the JPIP client. The JPIP client includes an image name of a target and the image area in the request and transmits the request to the JPIP server. The JPIP server obtains data of the image area from the target image on the basis of information about the image name, the image area, and the like, and returns a response including the data of the image area to the JPIP client.

The following describes the functional configuration of the JPIP system in the transmission method with a tile unit (JPT-stream method) with reference to FIG. 2. FIG. 2 is a functional configuration diagram of the JPIP system in the JPT-stream method.

As shown in FIG. 2, a client side in the transmission method with a tile unit (JPT-stream method) includes a request message generating unit, a response message decoding unit, and a tile part combining unit. A server side in the transmission method with a tile unit (JPT-stream method) includes a request message decoding unit, a tile identifying unit, a tile part reading unit, and a response message generating unit.

The request message generating unit generates a JPIP request message including a name of a target image, information about a view window, and the like. The request message decoding unit obtains the name of the target image, the information about the view window, and the like from the JPIP request message. The tile identifying unit selects a tile within an area of the requested view window on the basis of the information obtained by the request message decoding unit. In this case, the coordinates of the upper left corner ($tx_0$, $ty_0$) and the coordinates of the lower right corner ($tx_1$, $ty_1$) of the tile selected on a reference grid are represented as follows:

$$tx_0=(wx_0-T_{0x})/T_{sx}, ty_0=(wy_0-T_{0y})/T_{sy}$$

$$tx_1=(wx_1-T_{0x})/T_{sx}, ty_1=(wy_1-T_{0y})/T_{sy}$$

where, ($wx_0$, $wy_0$) and ($wx_1$, $wy_1$) indicate the coordinates of the upper left corner and the coordinates of the lower right corner of the view window normalized on the reference grid of a requested subband domain. Further, ($T_{0x}$, $T_{0y}$) and ($T_{sx}$, $T_{sy}$) indicate the offset and the size of the tile on the reference grid of the requested domain, respectively.

The tile reading unit obtains a tile part and the response message generating unit generates a response message. The client side receives the response message and decodes the response message in the response message decoding unit. Then, the client side connects the decoded data and the like (tile parts, for example) in the tile part combining unit or the like and generates a code stream.

The tile is a space unit for transmitting the code stream, so that the capability of transmission in space depends on the size of the tile. Thus, in the standard JPEG 2000, Start-Of-Tile-part (SOT), a marker having the length of a tile and positional information of a start, is defined. Accordingly, the client side is capable of readily receiving tile parts and simply connecting them, for example. Thus, it is relatively easy to construct the JPIP system in the transmission method with a tile unit (JPT-stream method). However, the transmission method with a tile unit (JPT-stream method) is problematic in that the capability of transmission in space is rough, since the tile is used as the transmission unit.

Next, the following describes the functional configuration of the JPIP system in the transmission method with a precinct unit (JPP-stream method) with reference to FIG. 3. FIG. 3 is a functional configuration diagram of the JPIP system in the JPP-stream method.

As shown in FIG. 3, a client side in the transmission method with a precinct unit (JPP-stream method) includes a request message generating unit, a response message decoding unit, a tile part assembling unit, and a tile part combining unit. A server side in the transmission method with a precinct unit (JPP-stream method) includes a request message decoding unit, a tile identifying unit, a precinct identifying unit, a packet reading unit, and a response message generating unit.

The request message generating unit generates a JPIP request message including a name of a target image, information about a view window, and the like. The request message decoding unit obtains the name of the target image, the information about the view window, and the like from the JPIP request message. The tile identifying unit selects a tile within an area of the requested view window on the basis of the information obtained by the request message decoding unit. The precinct identifying unit selects a precinct of the tile positioned within the area of the requested view window and selected by the tile identifying unit. In this case, the coordinates of the upper left corner ($px_0$, $py_0$) and the coordinates of the lower right corner $(px_1, py_1)$ of the precinct selected on a reference grid in a subband domain are represented as follows:

$$px_0 = \max(tx(n)_0, wx'_0)/2^{PPx}$$

$$py_0 = \max(ty(n)_0, wy'_0)/2^{PPy}$$

$$px_1 = \max(tx(n)_1, wx'_1)/2^{PPx}$$

$$py_1 = \max(ty(n)_1, wy'_1)/2^{PPy}$$

where, $(tx(n)_0, ty(n)_0)$ and $(tx(n)_1, ty(n)_1)$ indicate the coordinates of the upper left corner and the coordinates of the lower right corner of the nth tile on the reference grid of the subband domain. Also, PPx and PPy indicate indexes of the width and length of the precinct, respectively. Further, $(wx'_0, wy'_0)$ and $(wx'_1, wy'_1)$ indicate a range of the view window on the reference grid of the subband domain enlarged using a wavelet filter.

The packet reading unit collects (or reads out) packets concerning the precinct selected by the precinct reading unit. Then, the response generating unit generates a response message including the packets. The client side receives the response message, decodes the response message in the response message decoding unit, and assembles the packets and the like into a tile part in the tile part assembling unit. Thereafter, the client side connects the tile parts in the tile part combining unit and generates a code stream. An application in the client side decodes the code stream and displays an image on a display unit or the like of the client.

In the JPIP system in the transmission method with a precinct unit (JPP-stream method), the precinct, which is relatively smaller than a tile, is used as the unit. Thus, interactive capability in space is improved in comparison with the JPIP system in the transmission method with a tile unit (JPT-stream method) and it is possible to efficiently transmit encoded data in the area of the object view window to the client side. Accordingly, by constructing the JPIP system using the transmission method with a precinct unit (JPP-stream method), the JPIP system transmits an image with the improved efficiency.

Non-patent Document 1: M. Boliek, C. Christopoulos and E. Majani, "J JPEG 2000 Part 1 020719 (Final Publication Draft)," ISO/IEC JTC 1/SC 29/WG1 N2678, July 2002.

Non-patent Document 2: M. Gormish, D. Lee and M Marcellin, "JPEG 2000: Overview, Architecture, and Applications," Int. Conf. on Image Processing, Vancouver, Canada, September 2000.

Non-patent Document 3: R. Prandolini, G. Colyer, and S. Houchin, "15444-9:2004 JPEG 2000 image coding system—Part 9: Interactivity tools, APIs and protocols—JPIP," Final Publication Draft Revision 3, ISO/IEC JTC 1/SC 29/WG 1 N3463, November 2004.

Non-patent Document 4: D. Taubmana and R. Prandolini, "Architecture, Philosophy and Performance of JPIP: Internet Protocol Standard for JPEG 2000," VCIP2003 SPIE volume 5150 pp. 649-663, July 2003.

Non-patent Document 5: M. Gormish and S. Banerjee, "Tile-based transport of JPEG 2000 images," VLVBO3, Madrid, Spain, September 2003.

Patent Document 1: Japanese Laid-Open Patent Application No. 2004-274758

Patent Document 2: Japanese Laid-Open Patent Application No. 2004-208266

Patent Document 3: Japanese Laid-Open Patent Application No. 2004-349939

Patent Document 4: Japanese Laid-Open Patent Application No. 2004-228717

Patent Document 5: Japanese Laid-Open Patent Application No. 2004-40674

However, the packet reading unit of the server side in the transmission method with a precinct unit (JPP-stream method) must perform a complicated process. Also, on the client side in the transmission method with a precinct unit (JPP-stream method), the tile part assembling unit must reconstruct (or assemble) a tile part rearranging packets in each precinct, for example, and generate a code stream, so that the process of the client side becomes complicated and thus poses a problem. Therefore, the JPIP system in the transmission method with a precinct unit (JPP-stream method) is problematic in that it requires high construction costs. In particular, when the process of the client side is complicated and the construction costs thereof are increased, vendors and the like are likely to construct a client and the like in the transmission method with a tile unit (JPT-stream method) so as to reduce the construction costs. As a result, the number of clients in the transmission method with a tile unit (JPT-stream method) having an inferior transmission efficiency is increased. Further, there is a problem of compatibility between the transmission method with a tile unit (JPT-stream method) and the transmission method with a precinct unit (JPP-stream method), for example.

SUMMARY OF THE INVENTION

The present invention has been made in view of the aforementioned problems.

It is a general object of the present invention to provide an improved and useful image transmission method, computer-readable image transmission program, recording medium, and image transmission apparatus in which the above-mentioned problems are eliminated.

A more specific object of the present invention is to provide an image transmission method, a computer-readable image transmission program, a recording medium, and an image transmission apparatus in which the transmission efficiency of an image is improved and the complexity of the construction of the client side is reduced.

In order to achieve the aforementioned objects, the present invention provides an image transmission method in an image transmission apparatus for transmitting a compressed image generated by an image compression apparatus for performing, in each color component constructing an image, a first filter process and a second filter process in a first scanning direction on the image divided into a plurality of small image areas and then a third filter process and a fourth filter process in a second scanning direction so as to obtain coefficient data of a first level, obtaining coefficient data to an Nth level by repeating the first through fourth processes, independently encoding the coefficient data in each level included in coefficient areas, created by dividing each level into a plurality of coefficient areas, based on a unit concerning the coefficient areas in each level and in each coefficient area so as to generate code words, and generating a compressed image including the code words, the image transmission method comprising the steps of: receiving a request including request information having size information concerning an image and/or area information concerning the image; reconstructing small image areas by taking out code words constituting the small image areas based on the request information, the code words being independent of one another; and transmitting a response including the small image area to a requester in each small image area reconstructed in the step of reconstructing small image areas.

According to the present invention, there is provided the image transmission method in an image transmission apparatus for transmitting a compressed image generated by an image compression apparatus for performing, in each color component constructing an image, a first filter process and a second filter process in a first scanning direction on the image divided into a plurality of small image areas and then a third filter process and a fourth filter process in a second scanning direction so as to obtain coefficient data of a first level, obtaining coefficient data to an Nth level by repeating the first through fourth processes, independently encoding the coefficient data in each level included in coefficient areas, created by dividing each level into a plurality of coefficient areas, based on a unit concerning the coefficient areas in each level and in each coefficient area so as to generate code words, and generating a compressed image including the code words, the image transmission method comprising the steps of: receiving a request including request information having size information concerning an image and/or area information concerning the image; reconstructing small image areas by taking out code words constituting the small image areas based on the request information, the code words being independent of one another; and transmitting a response including the small image area to a requester in each small image area reconstructed in the step of reconstructing small image areas. Thus, it is possible to provide an image transmission method in which the transmission efficiency of an image is improved and the complexity of constructing a client side is reduced.

In addition, the coefficient data corresponds to wavelet coefficient (or wavelet coefficient data) or the like, for example. The level corresponds to a subband level or the like, for example. The coefficient areas correspond to precincts in JPEG 2000, for example. The code words correspond to encoded data, namely, encoded image data or the like, for example. Further, the small image areas correspond to tiles or the like, for example.

A computer-readable image transmission program, a recording medium, and an image transmission apparatus may be used so as to achieve the aforementioned objects.

According to the present invention, it is possible to provide an image transmission method, a computer-readable image transmission program, and an image transmission apparatus in which the transmission efficiency of an image is improved and the complexity of constructing a client side is reduced.

BRIEF DESCRIPTION OF THE DRAWINGS

FIG. 13 is a diagram showing an example of the generation of a tile part using precincts concerning an area requested from a client, the precincts being included in a tile;

FIG. 14 is an illustration showing the capability of interactive transmission in space when a tile part is generated using ZLPS in the JPT-stream method according to the present invention;

FIG. 15 is a table showing the capability of interactive transmission in space when a tile part is generated using ZLPS in the JPT-stream method according to the present invention;

FIG. 17 is a table showing the capability of progressive transmission when a tile part is generated without ZLPS in the JPT-stream method according to the present invention.

DESCRIPTION OF THE PREFERRED EMBODIMENTS

Figure 4:
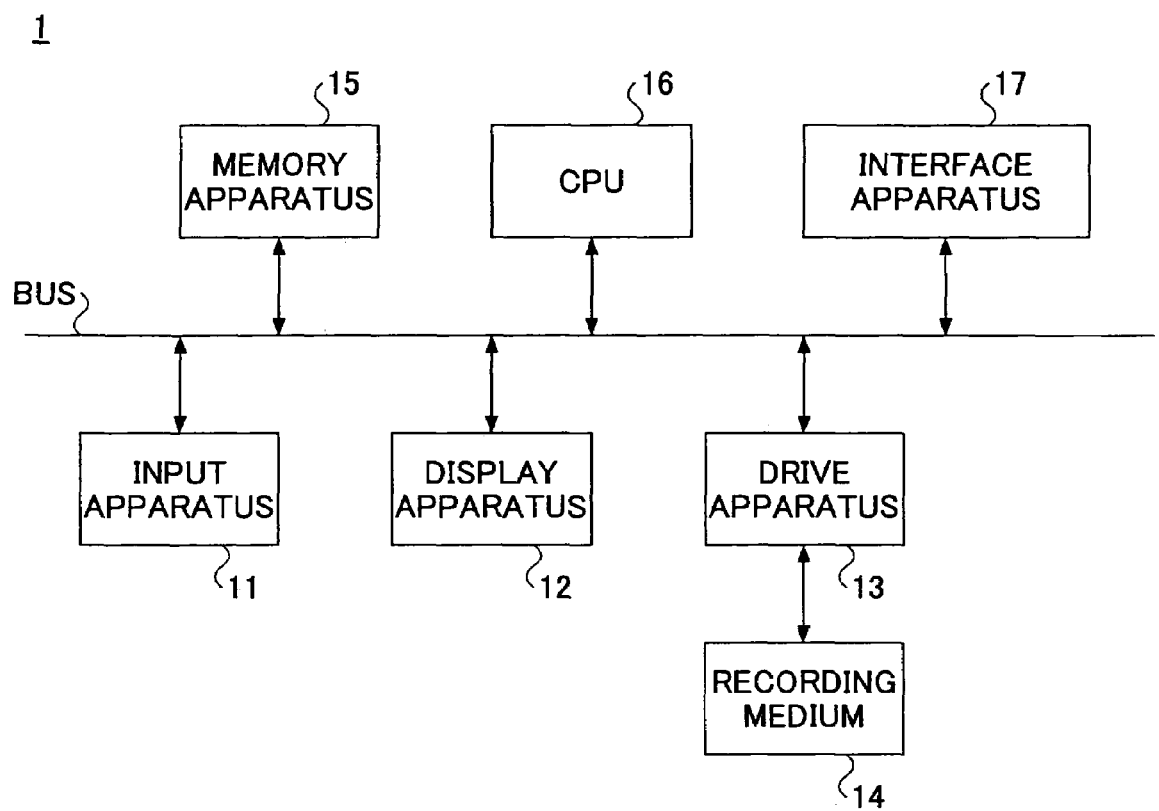
FIG. 4 is a configuration diagram of hardware of a server.

In the following, embodiments of the present invention will be described with reference to the accompanying drawings. FIG. 4 is a configuration diagram of hardware of a server. As shown in FIG. 4, the server includes an input apparatus 11, a display apparatus 12, a drive apparatus 13, a memory apparatus 15, a CPU 16, and an interface apparatus 17.

The input apparatus 11 comprises a keyboard and a mouse for operation by a user of the server and is used for inputting various types of operation information to the server. The display apparatus 12 comprises a display unit or the like for use by the user of the server and is used for displaying various types of information. The interface apparatus 17 is for connecting the server to a network and the like.

A program of the server is installed on the memory apparatus 15 or the like before shipment, supplied to the server using a recording medium 14 such as a CD-ROM after shipment, or downloaded via a network and the like, for example. The recording medium 14 is set in the drive apparatus 13 and the program is installed on the memory apparatus 15 or the like from the recording medium 14 via the drive apparatus 13.

The CPU 16 supplies functions as will be described in the following in accordance with the program while using the memory apparatus 15 as appropriate and performs processes as shown in a flowchart as will be described in the following, for example. The memory apparatus 15 stores image information and the like, for example.

In addition, a client and the like have the same hardware configuration as that of the server. The CPU of the client performs processes and the like as will be described in the following in accordance with a program of the client while using as appropriate the memory apparatus and the like of the client, for example.

Figure 5:
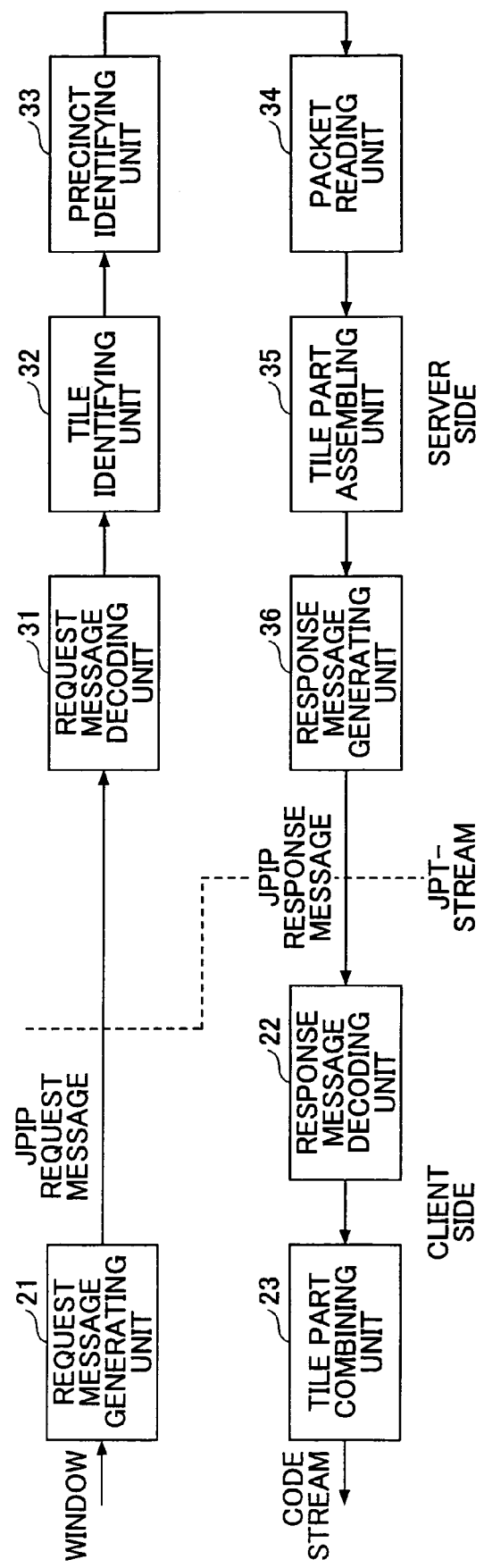
FIG. 5 is a functional configuration diagram of a JPIP system in a JPT-stream method according to the present invention.

In the following, an example of the functional configuration of a JPIP system in a transmission method with a tile unit (JPT-stream method) according to the present invention is described with reference to FIG. 5. FIG. 5 is a functional configuration diagram of the JPIP system in the JPT-stream method according to the present invention.

As shown in FIG. 5, a client side in the transmission method with a tile unit (JPT-stream method) according to the present invention includes a request message generating unit 21, a response message decoding unit 22, and a tile part combining unit 23. A server side in the transmission method with a tile unit (JPT-stream method) according to the present invention includes a request message decoding unit 31, a tile identifying unit 32, a precinct identifying unit 33, a packet reading unit 34, a tile part assembling unit 35, and a response message generating unit 36.

The request message generating unit 21 generates a JPIP request message including a name of a target image, information about a view window, and the like. The request message decoding unit 31 obtains the name of the target image, the information about the view window, and the like from the JPIP request message. The tile identifying unit 32 selects a tile within an area of the requested view window on the basis of the information obtained by the request message decoding unit 31. The precinct identifying unit 33 selects a precinct of the tile positioned within the area of the requested view window and selected by the tile identifying unit 32.

The packet reading unit 34 collects (or reads out) packets concerning the precinct selected by the precinct reading unit 33. The tile part assembling unit 35 assembles (or generates) a tile part including a tile header and packet data concerning the precinct within the area of the requested view window using the packets collected (or read out) by the packet reading unit 34 and position information about the packets. The response message generating unit 36 generates a response message including the tile part assembled by the tile part assembling unit 35.

The response message decoding unit 22 decodes the response message received from the server. The tile part combining unit 23 connects tile parts included in the response massage and generates a code stream.

Figure 1:
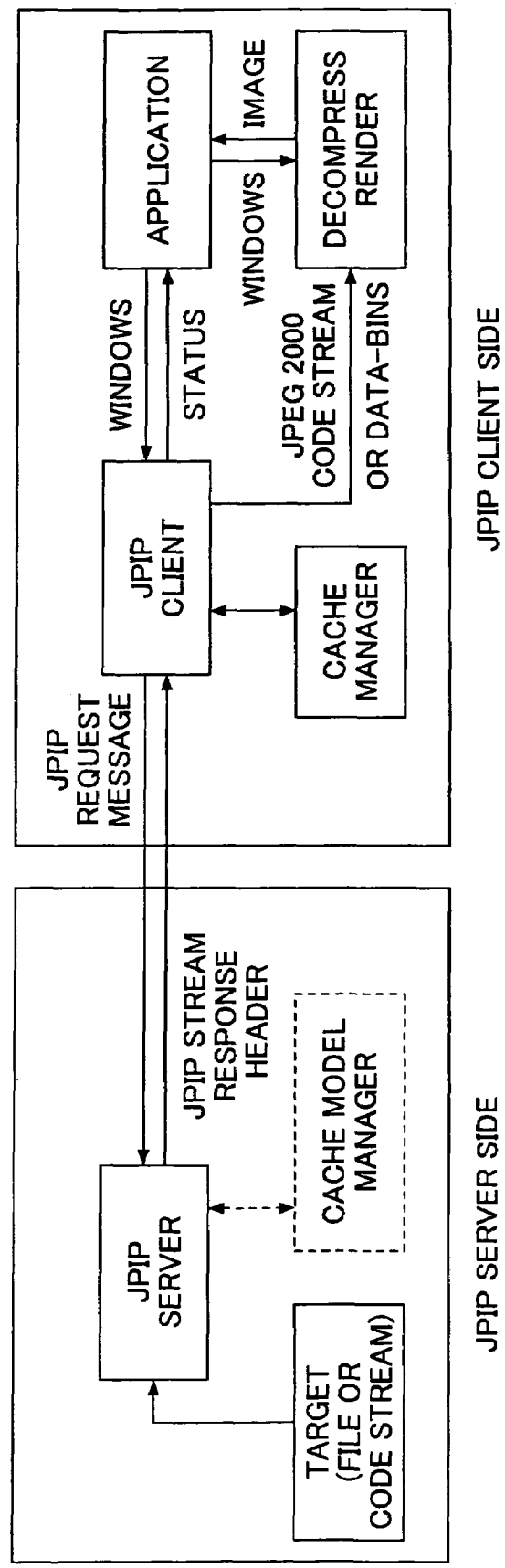
FIG. 1 is a configuration diagram of a JPIP system.
Figure 2:
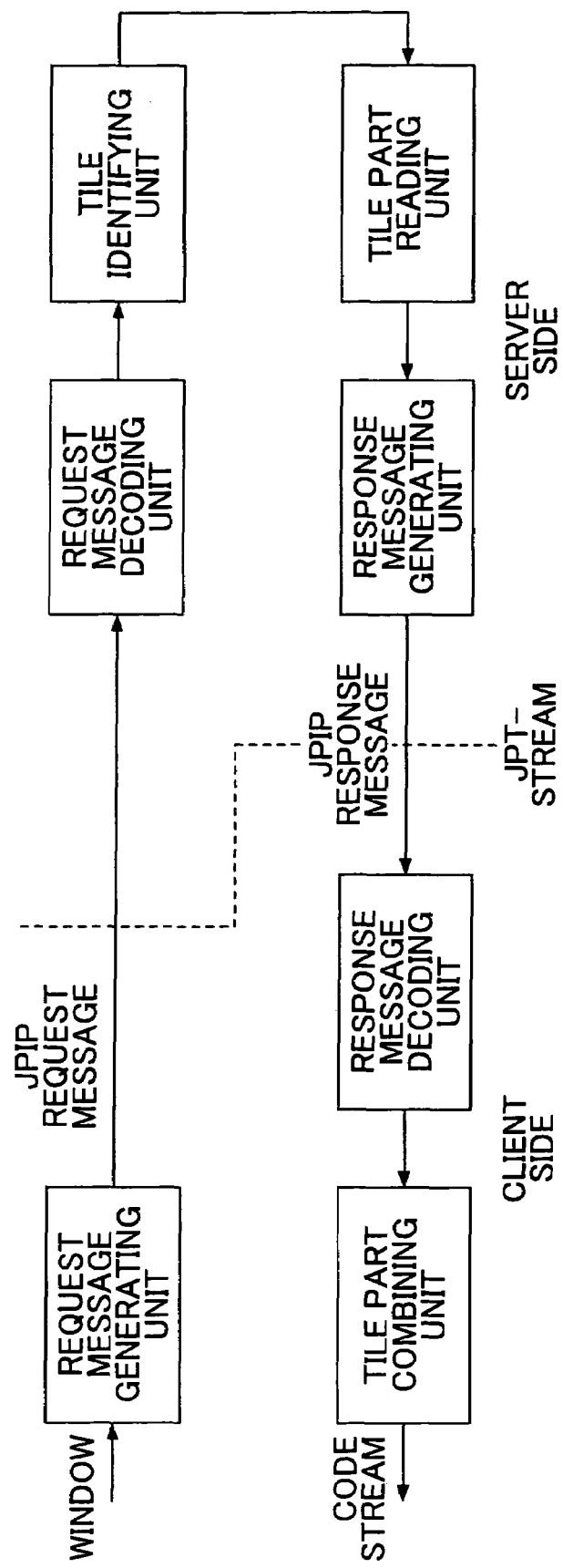
FIG. 2 is a functional configuration diagram of a JPIP system in a JPT-stream method.
Figure 3:
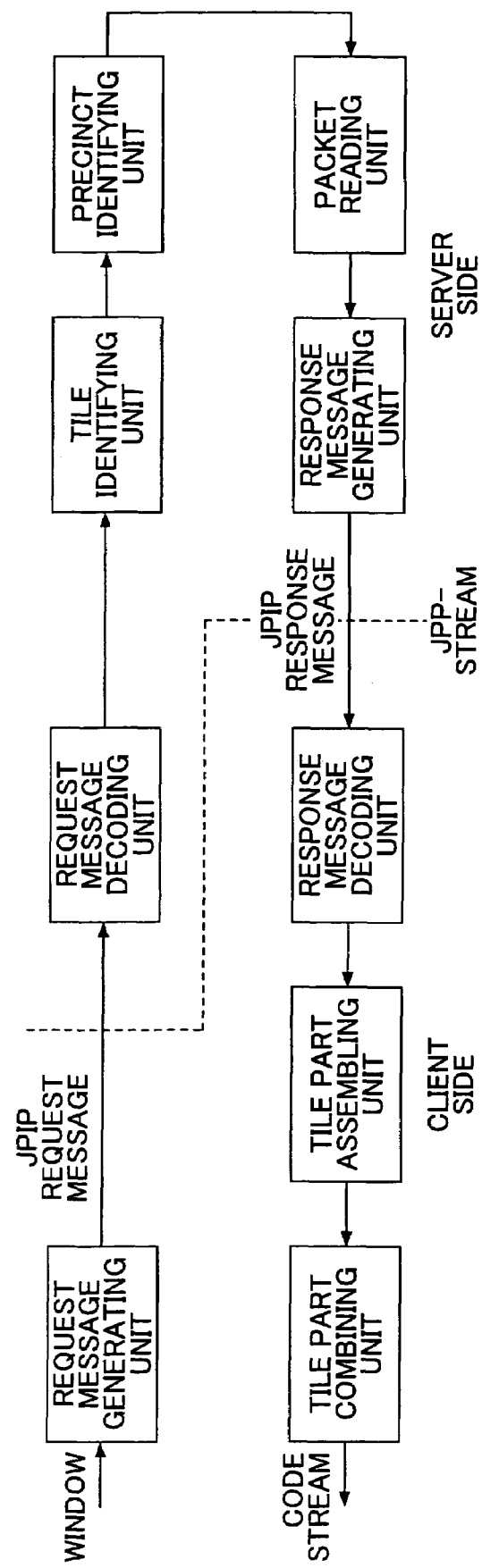
FIG. 3 is a functional configuration diagram of a JPIP system in a JPP-stream method.

In other words, the JPIP system in the JPT-stream method according to the present invention includes the tile part assembling unit, which is included in the client side in the JPIP system in the JPP-stream method shown in FIG. 3, in the server side as the tile part assembling unit 35. By employing such a structure, interactive capability in space is improved, and it is possible to efficiently transmit encoded data within the area of the object view window to the client side and to assemble the tile part on the server side, thereby reducing the processing on the client side and the complexity of the construction of the client side.

Figure 6:
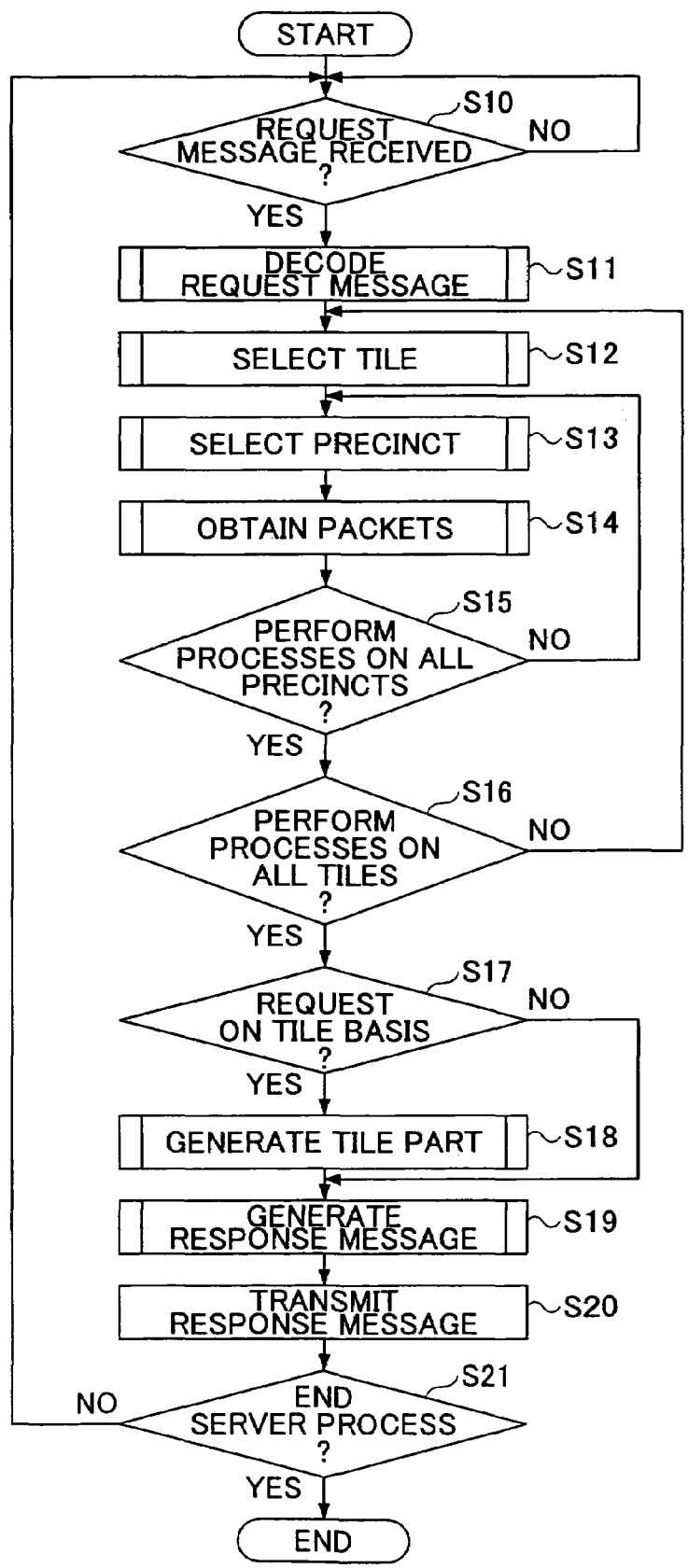
FIG. 6 is a flowchart showing processing in the server.

In the following, an example of the processing on the server side is described with reference to FIG. 6. FIG. 6 is a flowchart showing the processing in the server. In step S10, the server judges whether the JPIP request message is received from the client side. If the server judges that the JPIP request message is received from the client side (YES in step S10), the process proceeds to step S11. If the server judges that the JPIP request message is not received from the client side (NO in step S10), the process returns to step S10.

In step S11, the server decodes the received JPIP request message and performs a process for obtaining the name of the target image, the information about the view window, and the like included in the JPIP request message. Following step S11, the process proceeds to step S12 and the server performs a process for selecting a tile within the area of the requested view window on the basis of the information and the like obtained in step S11.

Following step S12, the process proceeds to step S13 and the server performs a process for selecting a precinct of the tile positioned within the area of the requested view window and selected in step S12.

Following step S13, the process proceeds to step S14 and the server performs a process for collecting (or reading out) packets concerning the precinct selected in step S13. Following step S14, the process proceeds to step S15 and the server judges whether the processes in steps S13 and S14 are performed on all precincts. If the server judges that the processes in steps S13 and S14 are performed on all the precincts (YES in step S15), the process proceeds to step S16. If the server judges that the processes in steps S13 and S14 are not performed on all the precincts (NO in step S15), the process proceeds to step S13.

In step S16, the server judges whether the processes in steps S12 through S15 are performed on all tiles. If the server judges that the processes in steps S12 through S15 are performed on all the tiles (YES in step S16), the process proceeds to step S17. If the server judges that the processes in steps S12 through S15 are not performed on all the tiles (NO in step S16), the process returns to step S12.

In step S17, the server judges whether the server is requested on a tile basis, namely, whether the server is requested to transmit the response message including the tile part. If the server judges that the server is requested on a tile basis (YES in step S17), the process proceeds to step S18. If the server judges that the server is not requested on a tile basis (NO in step S17), the process proceeds to step S19.

For example, if the JPIP request message received in step S10 and decoded in step S11 includes information about a request on a tile basis, the server judges that the server is requested on a tile basis. If the JPIP request message does not include information about a request on a tile basis, the server judges that the server is not requested on a tile basis.

In step S18, the server assembles (or generates) the tile part including a tile header and packet data concerning the precincts within the area of the requested view window using the packets collected (or read out) in step S14 and position information about the packets.

In step 19, the server generates the response message. For example, if the process proceeds to step S19 through step S18, the server generates a response message (JPT-stream message) including the tile part, and if the process proceeds from step S17 to step S19 without step S18, the server generates a response message (JPP-stream message) including the packets collected (or read out) in step S14.

Following step S19, the process proceeds to step S20 and the server transmits the response message created in step S19 to the client as a requestor, for example. Following step S20, the process proceeds to step S21 and the server judges whether to end the process (process concerning the JPIP system, for example). If the server judges that the process is to be ended (YES in step S21), the process is ended. If the server judges that the process is not to be ended (NO in step S21), the process proceeds to step S10.

By performing the process as shown in FIG. 6, it is possible to provide an image transmission method and the like in which the transmission efficiency of an image is improved and the complexity of constructing the client side is reduced.

The following describes the details of the process of the generation and the like of a new tile part in the tile part assembling unit 35 and the like. In the transmission method with a precinct unit (JPP-stream method), it is not necessary to transmit unselected (or unrequested) precincts to the client, the precincts being outside the area of the view window requested from the client. However, in the transmission method with a tile unit (JPT-stream method), in JPEG 2000, although it is not necessary to send unselected tiles, information (or data) about an entire tile part is required even when the client requests only a specific portion of a tile.

Figure 7:
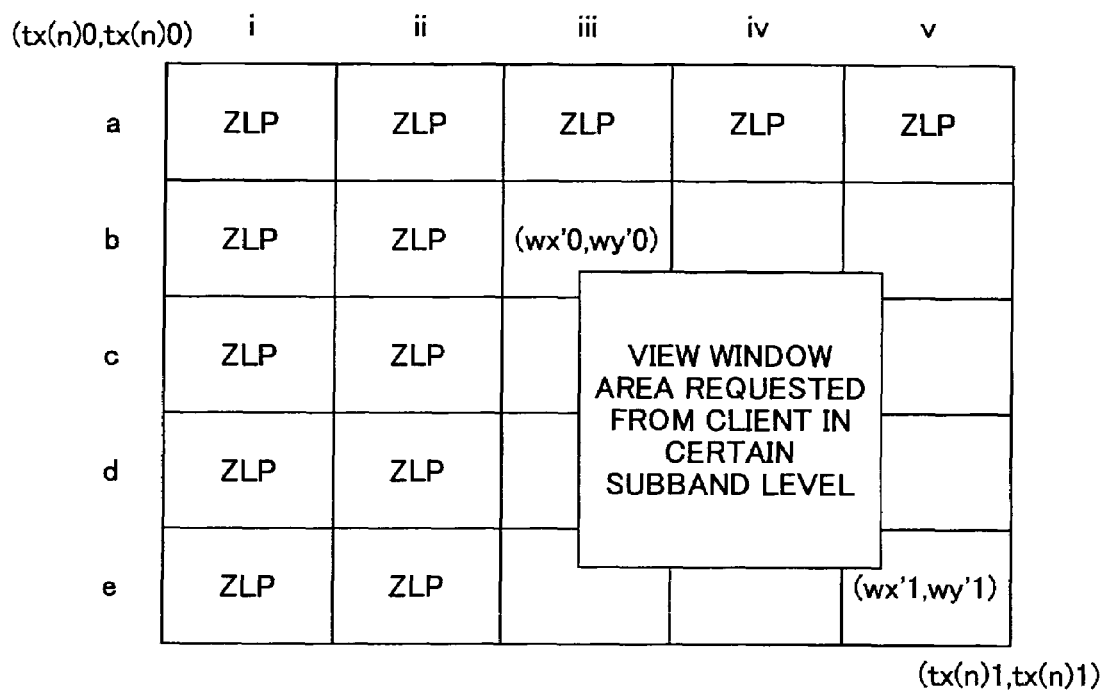
FIG. 7 is a diagram showing an example of a tile including ZLPS in a certain subband level.

Thus, the tile part assembling unit 35 generates the tile part including a zero length packet (hereafter simply referred to as ZLP) with only one byte (or several bytes if needed) for indicating that the length of packet data concerning the precinct of the unselected area is zero, for example. In the following, an example of a tile including ZLPS in a certain subband level is shown in FIG. 7. FIG. 7 is a diagram showing the example of the tile including ZLPS in the subband level.

In the example of FIG. 7, the tile in the subband level has 25 precincts and the area of the view window requested from the client covers the area of the precincts from (iii, b) to (v, e). The precinct identifying unit 33 identifies the precincts of this area and the packet reading unit 34 obtains packet data concerning the precincts identified by the precinct identifying unit 33. The tile part assembling unit 35 generates a new tile part in which the area of precincts unrequested by the client is filled with ZLPS.

When a frame size requested from the client is smaller than the size of a requested image in the server by $L^2$ in the length and width, the tile part assembling unit 35 does not have to send code data in L zones from the requested image size in the subband level. Accordingly, the tile part assembling unit 35 may generate a tile part without using ZLPS for the L zones of the requested image size. In addition, the tile part assembling unit 35 may generate the tile part filling the L zones with ZLPS. Instead of filling the precinct area unrequested by the client with ZLPS, the tile part assembling unit 35 may generate a new tile part including information about the nonexistence of packet data concerning the precincts of the unselected area. Also, the tile part assembling unit 35 may generate a new tile part including information about the fact that the length of packet data concerning a code block of the unselected area is zero. Further, the tile part assembling unit 35 may generate a new tile part including information about the nonexistence of packet data concerning the code block of the unselected area. The method for constructing ZLPS may use a packet for indicating the nonexistence of packet data and a packet for indicating that packet data is not included in addition to the aforementioned methods.

The following describes another example of the generation of the tile part including ZLPS and yet another example of the generation of the tile part using precincts necessary to send the precincts of the area of the view window requested from the client without using ZLPS.

Figure 8:
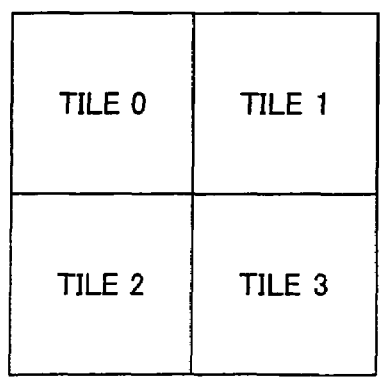
FIG. 8 is a diagram showing an example of a gray image divided into four tiles.
Figure 9:
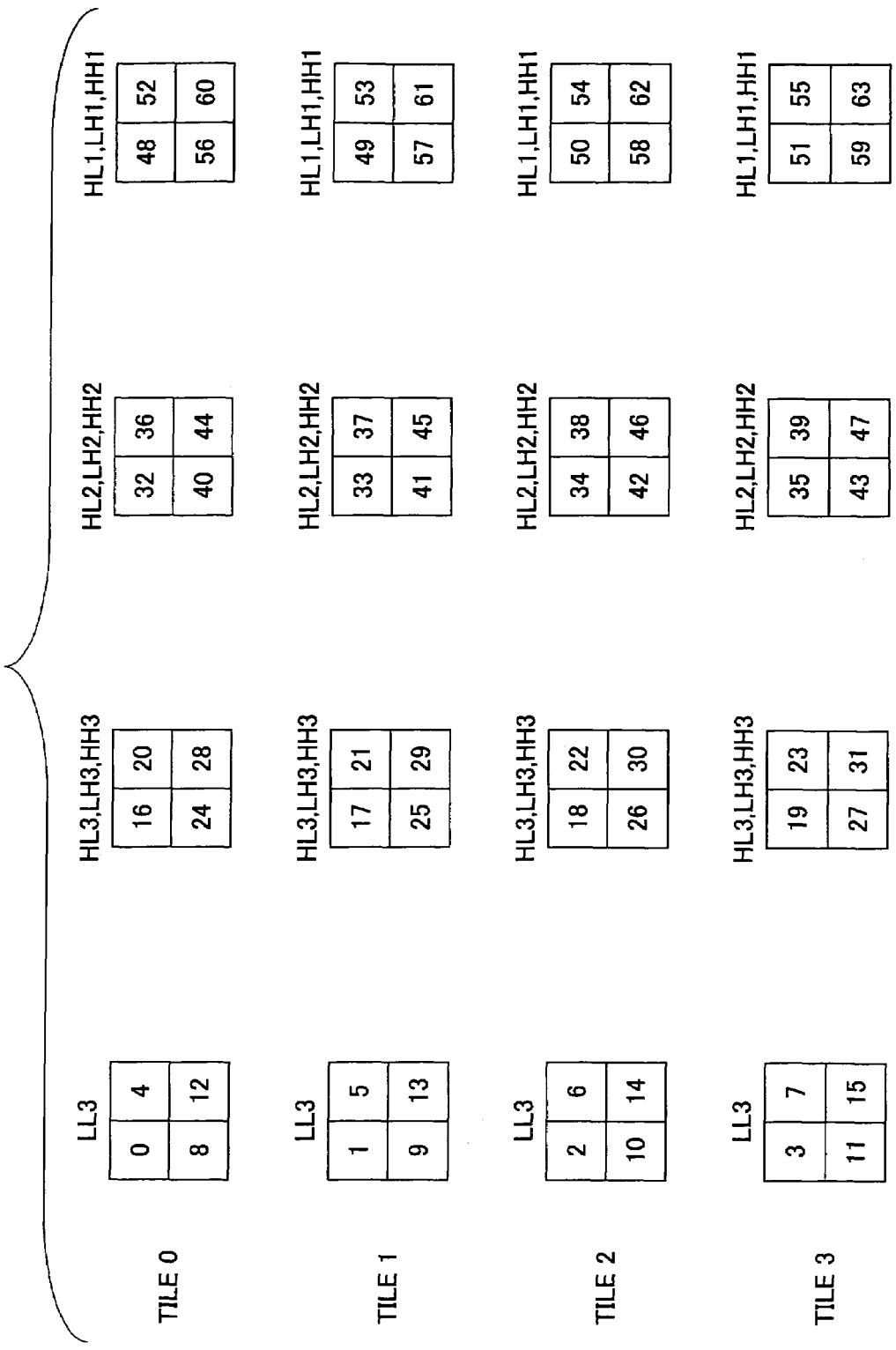
FIG. 9 is a diagram showing precincts and numbers thereof when each tile shown in FIG. 8 is wavelet-transformed in three levels.

FIG. 8 is a diagram showing an example of a gray image divided into four tiles. FIG. 9 is a diagram showing precincts and numbers thereof when each tile shown in FIG. 8 is wavelet-transformed in three levels.

Figure 10:
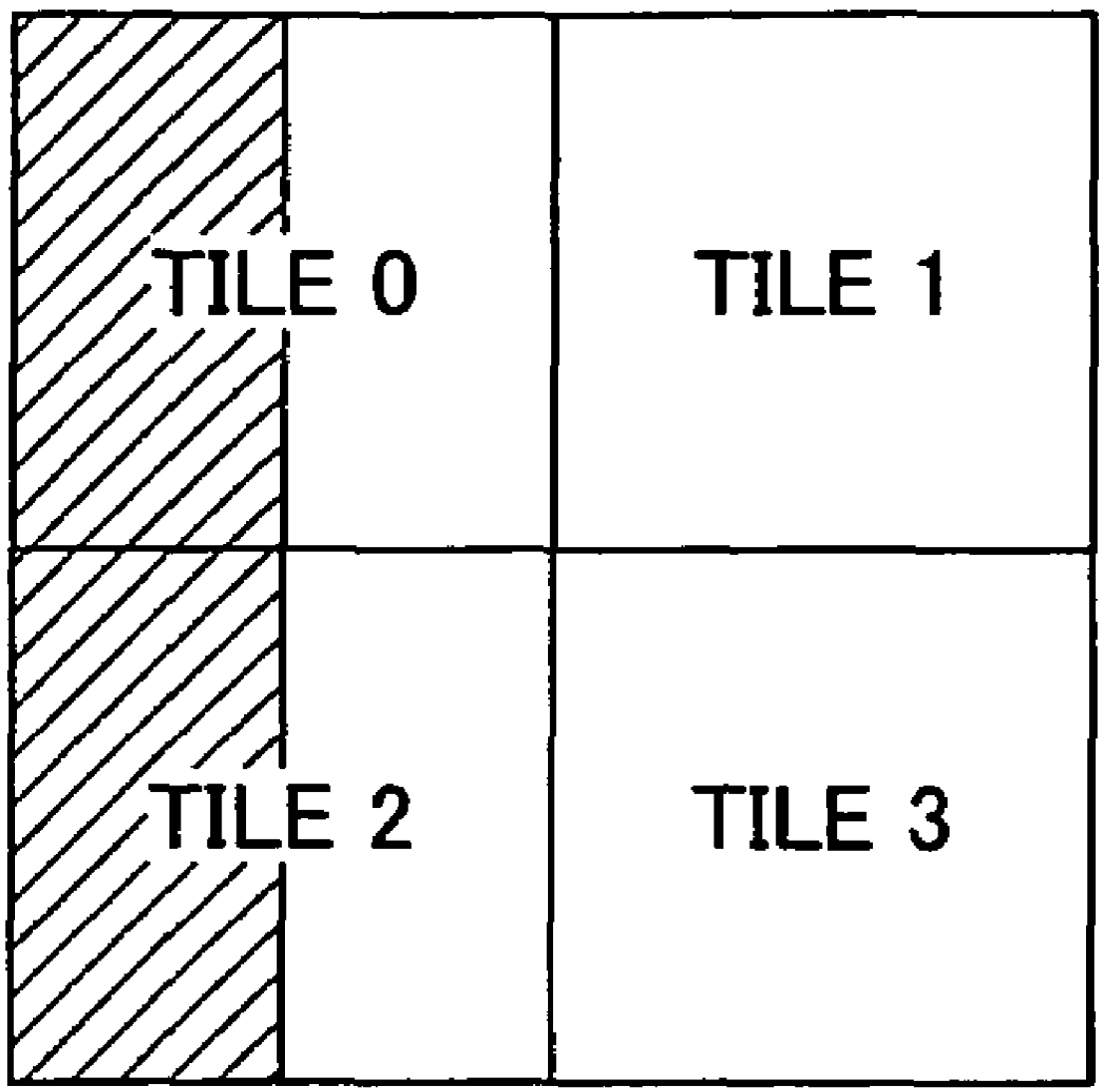
FIG. 10 is a first diagram showing an area concerning precincts to be returned to a client when a client accesses (or requests) a portion of the gray image in FIG. 8 reduced to ½.

The following describes an example of an area concerning precincts to be returned to the client when the client accesses (or requests) a portion of the gray image in FIG. 8 reduced to ½ with reference to FIG. 10. FIG. 10 is a first diagram showing the area concerning the precincts to be returned to the client when the client accesses (or requests) the portion of the gray image in FIG. 8 reduced to ½.

When the client accesses (or requests) the portion of the gray image in FIG. 8 reduced to ½, preferably, the server transmits only packet data concerning the precincts of a shaded portion of FIG. 10, for example. However, as mentioned above, in the transmission method with a tile unit (JPT-stream method), in JPEG 2000, it is necessary to transmit information (or data) about an entire tile part even when the client requests only a specific portion of an image (the portion of the gray image reduced to ½ in this example).

Figure 11:
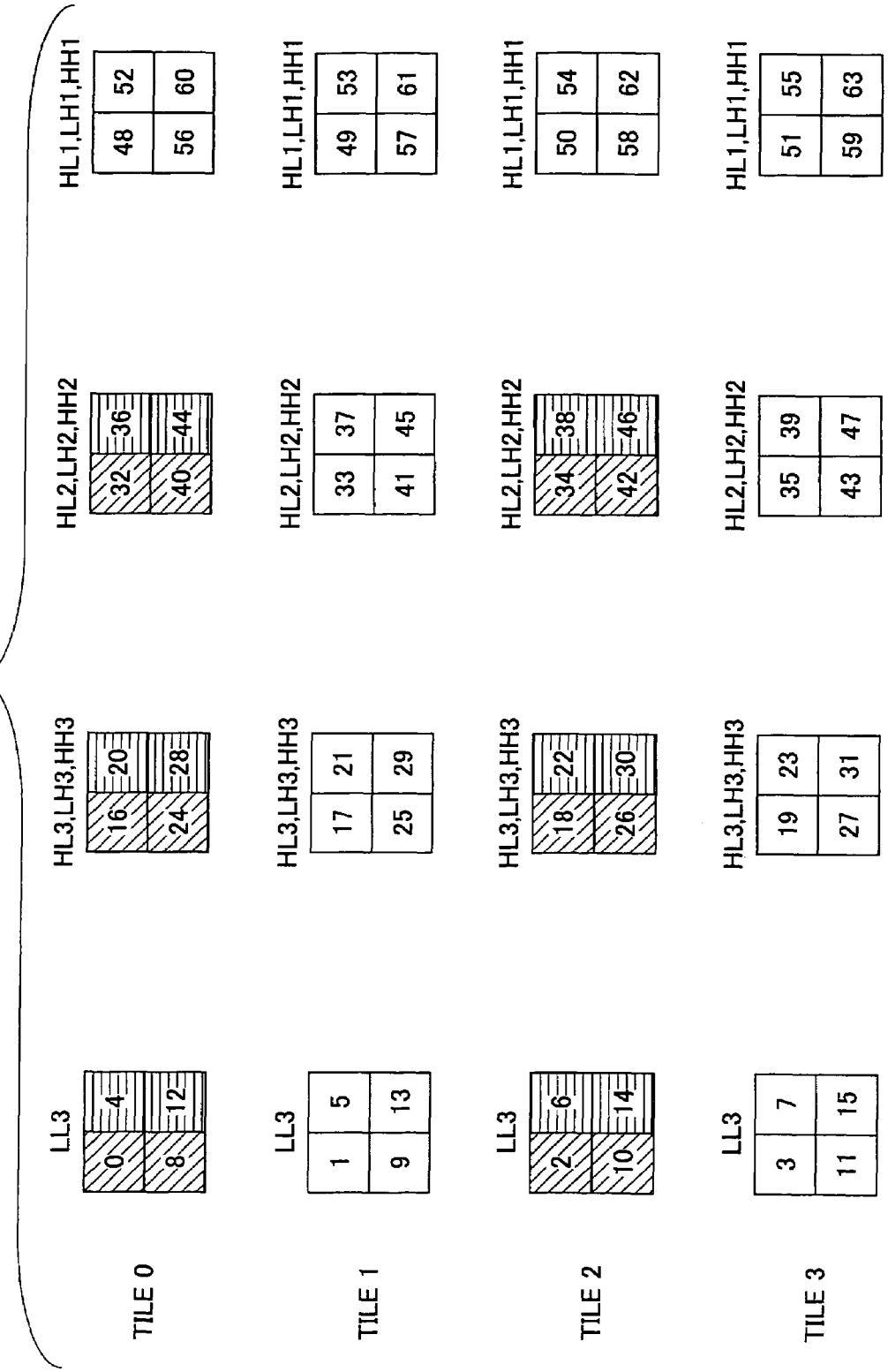
FIG. 11 is a diagram showing an example of the generation of a tile part using ZLPS.

The following describes an example of the generation of the tile part using ZLPS with reference to FIG. 11. FIG. 11 is a diagram showing the example of the generation of the tile part using ZLPS. The tile part assembling unit 35 generates the tile part using packet data concerning the precincts of shaded portions shown in FIG. 11 and the ZLPS of horizontal-striped portions shown in FIG. 11, namely, 0, 2, 8, 10, 16, 18, 24, 26, 32, 34, 40, and 42 in FIG. 11 and 4, 6, 12, 14, 20, 22, 28, 30, 36, 38, 44, and 46 in FIG. 11, respectively.

Figure 12:
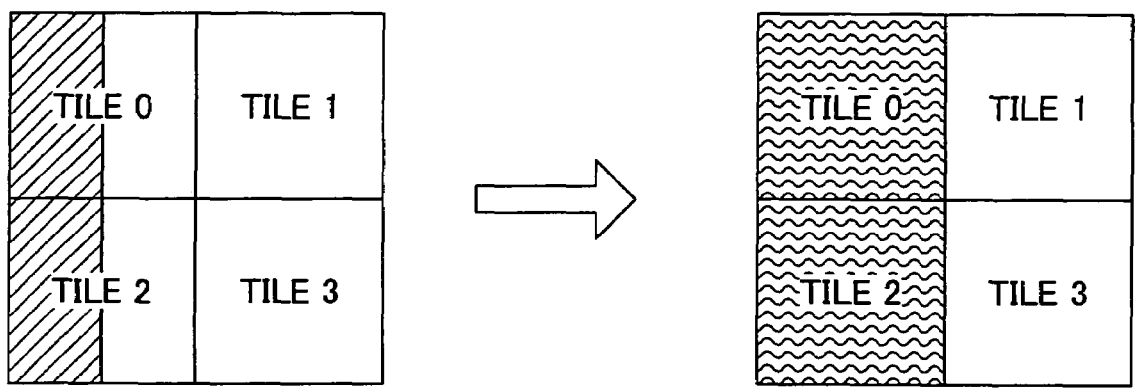
FIG. 12 is a second diagram showing an area concerning precincts to be returned to a client when the client accesses (or requests) a portion of the gray image in FIG. 8 reduced to ½.

The following describes another example of an area concerning precincts to be returned to the client when the client accesses (or requests) a portion of the gray image in FIG. 8 reduced to ½ with reference to FIG. 12. FIG. 12 is a second diagram showing the area concerning the precincts to be returned to the client when the client accesses (or requests) the portion of the gray image in FIG. 8 reduced to ½.

When the client accesses (or requests) the portion of the gray image in FIG. 8 reduced to ½, preferably, the server transmits only packet data concerning the precincts of a shaded portion in the left of FIG. 12, for example. However, as mentioned above, in the transmission method with a tile unit (JPT-stream method), in the JPEG 2000, it is necessary to transmit information (or data) about an entire tile part even when the client requests only a specific portion of an image (the portion of the gray image reduced to ½ in this example). Thus, the server generates the tile part as shown in the right of FIG. 12, using the packet data concerning the precincts included in the tile including the precincts shown in the shaded portion in the left of FIG. 12.

Figure 13:
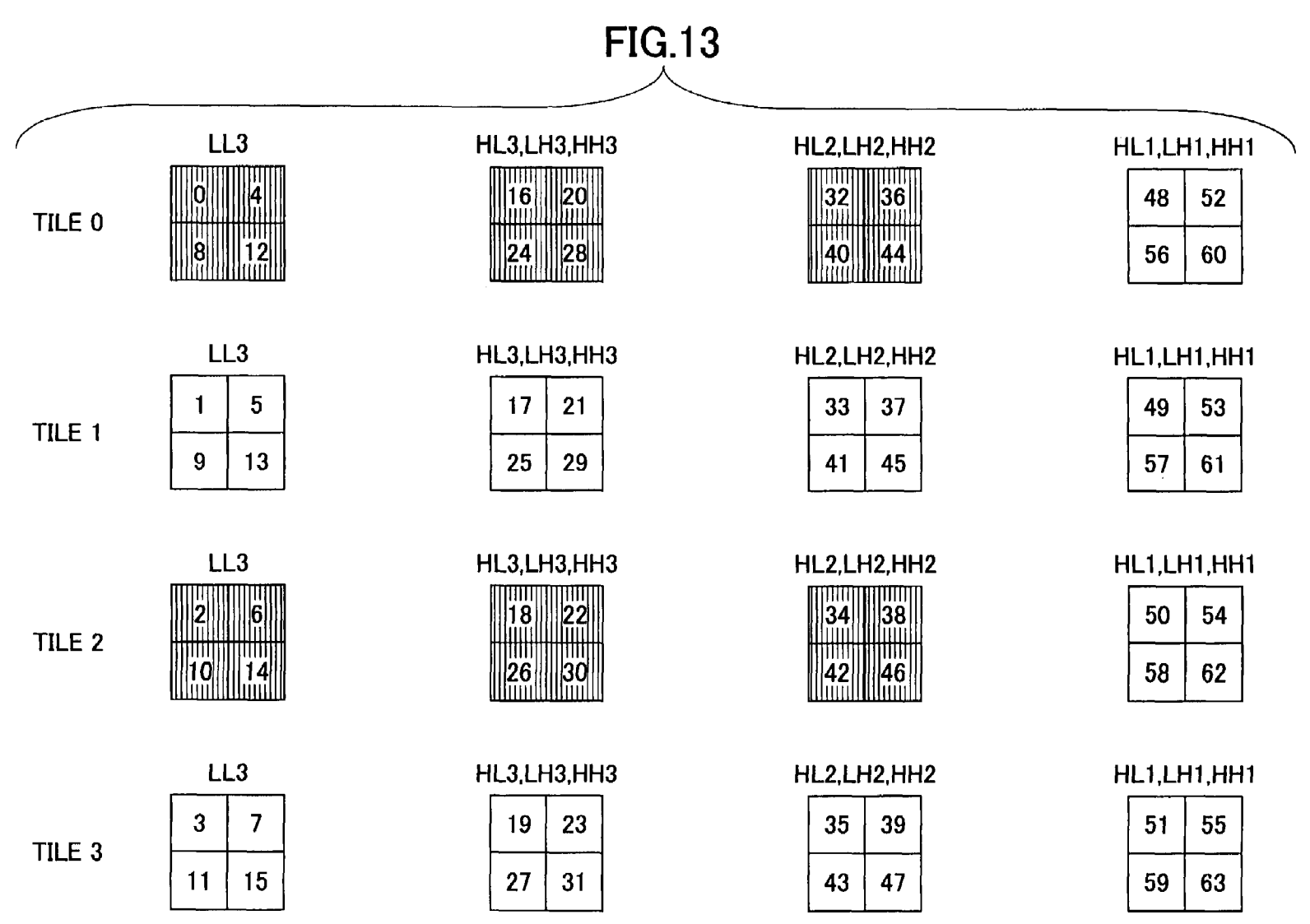

The following describes an example of the generation of the tile part using precincts included in the tile including the precincts concerning an area requested from the client with reference to FIG. 13. FIG. 13 is a diagram showing the example of the generation of the tile part using the precincts concerning the area requested from the client, the precincts being included in the tile.

The tile part assembling unit 35 generates the tile part using packet data concerning the precincts of striped portions shown in FIG. 13, for example.

The following describes the capability of interactive transmission in space when a tile part is generated using ZLPS in the JPT-stream method according to the present invention with reference to FIGS. 14 and 15. FIG. 14 is an illustration showing the capability of interactive transmission in space when the tile part is generated using ZLPS in the JPT-stream method according to the present invention.

FIG. 14-(A) is an image when the normal JPT-stream method is used and FIG. 14-(B) is an image when the JPT-stream method according to the present invention is used. Squares in the middle of FIG. 14-(A) and (B) indicate the area of a view window and crossed lines indicate the boundary of tiles. As clearly shown in FIG. 14, the JPT-stream method according to the present invention is capable of constructing necessary tile parts and transmitting them to the client.

FIG. 15 is a table showing the capability of interactive transmission in space when the tile part is generated using ZLPS in the JPT-stream method according to the present invention. In FIG. 15, the stream code size is 166582 bytes and the size of the frame is (512, 512). As shown in FIG. 15, the JPT-stream method according to the present invention has the same capability of interactive transmission in space as that of the JPP-stream method.

Figure 16:
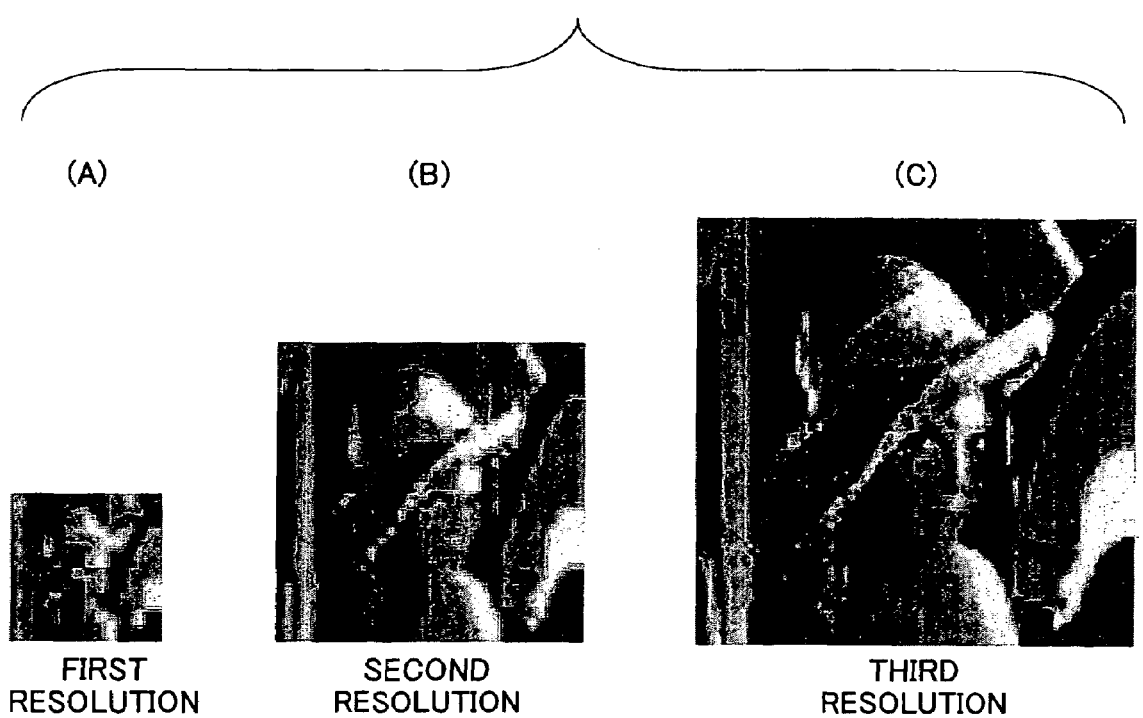
FIG. 16 is an illustration showing the capability of progressive transmission when a tile part is generated without ZLPS in the JPT-stream method according to the present invention.

The following describes the capability of progressive transmission in the JPT-stream method according to the present invention with reference to FIGS. 16 and 17. FIG. 16 is an illustration showing the capability of progressive transmission when the tile part is generated without using ZLPS in the JPT-stream method according to the present invention.

As shown in FIG. 16, progressive transmission can be readily performed also in the JPT-stream method according to the present invention.

FIG. 17 is a table showing the capability of progressive transmission when the tile part is generated without using ZLPS in the JPT-stream method according to the present invention. In FIG. 17, the stream code size is 164962 bytes and the volume of transmission bytes in the normal JPT-stream is 168626 bytes. As shown in FIG. 17, the JPT-stream method according to the present invention is capable of transmitting an image with improved resolution in comparison with the normal the JPP-stream method.

In the aforementioned embodiment, the tile part assembling unit 35 generates the tile part including a tile header and packet data concerning the precincts within the area of the requested view window using the packets and position information about the packets. However, the tile part assembling unit 35 may generate a tile part in each subband level using packet data concerning the subband level of the requested view window, the tile part including the packet data.

Further, the tile part assembling unit 35 may generate a tile part in each color component using precincts concerning the color component or packet data concerning a subband level, the tile part including the packet data.

As mentioned above, according to the present invention, it is possible to provide an image transmission method, a computer-readable image transmission program, a recording medium, and an image transmission apparatus in which the transmission efficiency of an image is improved and the complexity of the construction of the client side is reduced. In this case, the image transmission apparatus corresponds to the aforementioned server or the like, for example.

The present invention is not limited to the specifically disclosed embodiment, and variations and modifications may be made without departing from the scope of the present invention.

The present application is based on Japanese priority application No. 2005-111037 filed Apr. 7, 2005, the entire contents of which are hereby incorporated herein by reference.

What is claimed is:

1. An image transmission method in an image transmission apparatus for transmitting a compressed image generated by an image compression apparatus for performing, in each color component constructing an image, a first filter process and a second filter process in a first scanning direction on the image divided into a plurality of small image areas and then a third filter process and a fourth filter process in a second scanning direction so as to obtain coefficient data of a first level, obtaining coefficient data to an Nth level by repeating the first through fourth processes, independently encoding the coefficient data in each level included in coefficient areas, created by dividing each level into a plurality of coefficient areas, based on a unit concerning the coefficient areas in each level and in each coefficient area so as to generate code words, and generating a compressed image including the code words, the image transmission method comprising the steps of:
receiving a request including request information having size information concerning an image and/or area information concerning the image;
reconstructing small image areas by taking out code words constituting the small image areas based on the request information, the code words being independent of one another; and
transmitting a response including the small image area to a requester in each small image area reconstructed in the step of reconstructing small image areas.

2. The image transmission method according to claim 1 wherein the step of reconstructing small image areas includes taking out, in each coefficient area, the code words constituting the small image areas and independent of one another, and reconstructing the small image areas based on the request information.

3. The image transmission method according to claim 1 wherein the step of reconstructing small image areas includes taking out, in each level, the code words constituting the small image areas and independent of one another, and reconstructing the small image areas based on the request information.

4. The image transmission method according to claim 1 wherein the step of reconstructing small image areas includes taking out, in each color component, the code words constituting the small image areas and independent of one another, and reconstructing the small image areas based on the request information.

5. The image transmission method according to claim 1 wherein
coefficient area codes including the code words belonging to the coefficient areas in the small image areas have information for handling the code words in the coefficient areas in each coefficient area code;
the coefficient area codes are stored in the small image areas in order of the coefficient area codes; and
the step of reconstructing small image areas includes reconstructing the small image areas using coefficient area codes holding information for indicating the non-existence of the coefficient area codes.

6. The image transmission method according to claim 1 wherein
coefficient area codes including the code words belonging to the coefficient areas in the small image areas have information for handling the code words in the coefficient areas in each coefficient area code;
the coefficient area codes are stored in the small image areas in order of the coefficient area codes; and
the step of reconstructing small image areas includes reconstructing the small image areas using coefficient area codes holding information for indicating that the length of data of the coefficient area codes is zero.

7. The image transmission method according to claim 1 wherein
coefficient area codes including the code words belonging to the coefficient areas in the small image areas have information for handling the code words in the coefficient areas in each coefficient area code;
the coefficient area codes are stored in the small image areas in order of the coefficient area codes; and
the step of reconstructing small image areas includes reconstructing the small image areas using coefficient area codes holding information for indicating the non-existence of code words in the coefficient area codes.

8. The image transmission method according to claim 1 wherein
coefficient area codes including the code words belonging to the coefficient areas in the small image areas have information for handling the code words in the coefficient areas in each coefficient area code;
the coefficient area codes are stored in the small image areas in order of the coefficient area codes; and
the step of reconstructing small image areas includes reconstructing the small image areas using coefficient area codes holding information for indicating that the length of code words in the coefficient area codes is zero.

9. A computer-readable image transmission program which, when executed by a computer, causes the computer to perform an image transmission method in an image transmission apparatus for transmitting a compressed image generated by an image compression apparatus for performing, in each color component constructing an image, a first filter process and a second filter process in a first scanning direction on the image divided into a plurality of small image areas and then a third filter process and a fourth filter process in a second scanning direction so as to obtain coefficient data of a first level, obtaining coefficient data to an Nth level by repeating the first through fourth processes, independently encoding the coefficient data in each level included in coefficient areas, created by dividing each level into a plurality of coefficient areas, based on a unit concerning the coefficient areas in each level and in each coefficient area so as to generate code words, and generating a compressed image including the code words, the image transmission method comprising the steps of:
receiving a request including request information having size information concerning an image and/or area information concerning the image;
reconstructing small image areas by taking out code words constituting the small image areas based on the request information, the code words being independent of one another; and
transmitting a response including the small image area to a requester in each small image area reconstructed in the step of reconstructing small image areas.

10. The computer-readable image transmission program according to claim 9 wherein the step of reconstructing small image areas includes taking out, in each coefficient area, the code words constituting the small image areas and independent of one another, and reconstructing the small image areas based on the request information.

11. The computer-readable image transmission program according to claim 9 wherein the step of reconstructing small image areas includes taking out, in each level, the code words constituting the small image areas and independent of one another, and reconstructing the small image areas based on the request information.

12. The computer-readable image transmission program according to claim 9 wherein the step of reconstructing small image areas includes taking out, in each color component, the code words constituting the small image areas and independent of one another, and reconstructing the small image areas based on the request information.

13. The computer-readable image transmission program according to claim 9 wherein
coefficient area codes including the code words belonging to the coefficient areas in the small image areas have information for handling the code words in the coefficient areas in each coefficient area code;
the coefficient area codes are stored in the small image areas in order of the coefficient area codes; and
the step of reconstructing small image areas includes reconstructing the small image areas using coefficient area codes holding information for indicating the non-existence of the coefficient area codes.

14. The computer-readable image transmission program according to claim 9 wherein
coefficient area codes including the code words belonging to the coefficient areas in the small image areas have information for handling the code words in the coefficient areas in each coefficient area code;
the coefficient area codes are stored in the small image areas in order of the coefficient area codes; and
the step of reconstructing small image areas includes reconstructing the small image areas using coefficient area codes holding information for indicating that the length of data of the coefficient area codes is zero.

15. The computer-readable image transmission program according to claim 9 wherein
coefficient area codes including the code words belonging to the coefficient areas in the small image areas have information for handling the code words in the coefficient areas in each coefficient area code;
the coefficient area codes are stored in the small image areas in order of the coefficient area codes; and
the step of reconstructing small image areas includes reconstructing the small image areas using coefficient area codes holding information for indicating the non-existence of code words in the coefficient area codes.

16. The computer-readable image transmission program according to claim 9 wherein
coefficient area codes including the code words belonging to the coefficient areas in the small image areas have information for handling the code words in the coefficient areas in each coefficient area code;
the coefficient area codes are stored in the small image areas in order of the coefficient area codes; and
the step of reconstructing small image areas includes reconstructing the small image areas using coefficient area codes holding information for indicating that the length of code words in the coefficient area codes is zero.

17. A computer-readable recording medium wherein the computer-readable image transmission program according to claim 9 is recorded.

18. An image transmission apparatus for transmitting a compressed image generated by an image compression apparatus for performing, in each color component constructing an image, a first filter process and a second filter process in a first scanning direction on the image divided into a plurality of small image areas and then a third filter process and a fourth filter process in a second scanning direction so as to obtain coefficient data of a first level, obtaining coefficient data to an Nth level by repeating the first through fourth processes, independently encoding the coefficient data in each level included in coefficient areas, created by dividing each level into a plurality of coefficient areas, based on a unit concerning the coefficient areas in each level and in each coefficient area so as to generate code words, and generating a compressed image including the code words, the image transmission apparatus comprising:
a request receiving unit configured to receive a request including request information having size information concerning an image and/or area information concerning the image;
a small image area reconstructing unit configured to reconstruct small image areas by taking out code words constituting the small image areas based on the request information, the code words being independent of one another; and
a response transmitting unit configured to transmit a response including the small image area to a requester in each small image area reconstructed by the small image area reconstructing unit.

19. The image transmission apparatus according to claim 18 wherein the small image area reconstructing unit takes out, in each coefficient area, the code words constituting the small image areas and independent of one another, and reconstructs the small image areas based on the request information.

20. The image transmission apparatus according to claim 18 wherein the small image area reconstructing unit takes out, in each level, the code words constituting the small image areas and independent of one another, and reconstructs the small image areas based on the request information.

21. The image transmission apparatus according to claim 18 wherein the small image area reconstructing unit takes out, in each color component, the code words constituting the small image areas and independent of one another, and reconstructs the small image areas based on the request information.

22. The image transmission apparatus according to claim 18 wherein
coefficient area codes including the code words belonging to the coefficient areas in the small image areas have information for handling the code words in the coefficient areas in each coefficient area code;
the coefficient area codes are stored in the small image areas in order of the coefficient area codes; and
the small image area reconstructing unit reconstructs the small image areas using coefficient area codes holding information for indicating the nonexistence of the coefficient area codes.

23. The image transmission apparatus according to claim 18 wherein
coefficient area codes including the code words belonging to the coefficient areas in the small image areas have information for handling the code words in the coefficient areas in each coefficient area code;
the coefficient area codes are stored in the small image areas in order of the coefficient area codes; and
the small image area reconstructing unit reconstructs the small image areas using coefficient area codes holding information for indicating that the length of data of the coefficient area codes is zero.

24. The image transmission apparatus according to claim 18 wherein
coefficient area codes including the code words belonging to the coefficient areas in the small image areas have information for handling the code words in the coefficient areas in each coefficient area code;
the coefficient area codes are stored in the small image areas in order of the coefficient area codes; and
the small image area reconstructing unit reconstructs the small image areas using coefficient area codes holding information for indicating the nonexistence of code words in the coefficient area codes.

25. The image transmission apparatus according to claim 18 wherein
coefficient area codes including the code words belonging to the coefficient areas in the small image areas have information for handling the code words in the coefficient areas in each coefficient area code;
the coefficient area codes are stored in the small image areas in order of the coefficient area codes; and
the small image area reconstructing unit reconstructs the small image areas using coefficient area codes holding information for indicating that the length of code words in the coefficient area codes is zero.

* * * * *